United States Patent [19]
Wester-Ebbinghaus et al.

[11] Patent Number: 4,878,247
[45] Date of Patent: Oct. 31, 1989

[54] METHOD FOR THE PHOTOGRAMMETRICAL PICK UP OF AN OBJECT WITH THE AID OF AT LEAST ONE OPTO-ELECTRIC SOLID-STATE SURFACE SENSOR

[75] Inventors: Wilfried Wester-Ebbinghaus, Barsinghausen; Thomas Luhmann, Hanover; Juergen Mangelsdorf, Cremlingen; Peter Pini, Brunswick, all of Fed. Rep. of Germany

[73] Assignee: Rollei Fototechnic GmbH, Brunswick, Fed. Rep. of Germany

[21] Appl. No.: 27,530

[22] Filed: Mar. 18, 1987

[30] Foreign Application Priority Data

Mar. 19, 1986 [EP] European Pat. Off. ........ 86103748.9

[51] Int. Cl.$^4$ .............................................. G06K 9/00
[52] U.S. Cl. ....................................... 382/1; 356/395; 356/396
[58] Field of Search ................. 382/1; 356/2, 4.5, 395, 356/357, 358, 396

[56]       References Cited
U.S. PATENT DOCUMENTS 3,982,837  9/1976  Cummins ............................. 356/395
4,149,788  4/1979  Brown ................................. 354/203

FOREIGN PATENT DOCUMENTS

3428325C2  11/1985  Fed. Rep. of Germany .

OTHER PUBLICATIONS

Luhmann et al., "Rolleimetric RS-A New Digital Image Processing System", presented to ISPRS Commission II Symposium, Balt., Md., 1986, pp. 1-10.
Luhmann, "Automatic Point Determination in a Reseau-Scanning Pattern", *Paper Symposium ISPRS Comm. V.* Ottawa, 1986, p. 9.
Wester Ebbinghaus "CCD-Reseau-Scanning-A New Principle for Digital Image Processing", *The Symposium of Commission I of the Int. Soc. for Photogrammetry & Remote Sensing* 1986, pp. 445-543.
Luhmann et al. "Photogrammetric Data Acquisition Using the Digital Reseau-Scanning System" Symposium ISPRS Commission I, 1986, pp. 381-384.

*Primary Examiner*—Leo H. Boudreau
*Assistant Examiner*—Joseph Mancuso
*Attorney, Agent, or Firm*—Foley & Lardner, Schwartz, Jeffery, Schwaab, Mack, Blumenthal & Evans

[57]       ABSTRACT

The photogrammetrical pick up of an object with the aid of an opto-electronic solid-state surface sensor can be carried out in partial-images over a large image format if the position of the sensor in the image plane is determined by means of a reseau. This can be done by imaging at least one reseau mesh in the sensor image. After measuring the reseau points in the coordinate system of the partial-image and transforming to the nominal values in the system of the reseau, the position of the surface sensor and transformation parameters for all image points within the reseau mesh are obtained. For this purpose, the approximation position of the sensor must be known with sufficient accuracy to be able to determined the number of the reseau mesh as an unambiguous identification of the reseau points.

23 Claims, 11 Drawing Sheets

METHOD FOR THE PHOTOGRAMMETRICAL PICK UP OF AN OBJECT WITH THE AID OF AT LEAST ONE OPTO-ELECTRIC SOLID-STATE SURFACE SENSOR

BACKGROUND OF THE INVENTION

The present invention relates to a method for the photogrammetrical pick up of an object with the aid of at least one opto-electric solid-state surface sensor, the image area of which is smaller than that of the total image sought to be recorded. The point array of a reseaus (glass plate with suitable point markings distributed like a raster) covering the total image is included in the photogrammatical imaging system, and the surface sensor is arranged in the imaging space in such a manner that it images in each case at least one mesh of the reseau covering the area in the sensor image. For the opto-electric analog/digital conversion of images present in analog form, the transparent master is brought in contact with a scanning reseau and is projected, together with the scanning reseau, onto a sensor area with the aid of an objective. The sensor surface and objective are jointly displaced from reseau mesh to reseau mesh for continuous recording.

The present invention also relates to a method for the photogrammetrical pick up of a stationary object with the aid of at least one opto-electric solid-state surface sensor, the image area of which is smaller than that of the total image sought to be recorded. The point array of a reseau (glass plate with suitable point markings distributed like a raster) covering the total image is included in the photogrammetrical imaging system, and the surface sensor is arranged in the imaging space in such a manner that it images in each case at least one mesh of the reseau covering the area in the sensor image. For an opto-electric recording system for recording stationary objects, a sensor area is arranged behind the chamber reseau arranged in the image plane of the recording chamber so that the chamber reseau can be projected, together with the object to be recorded, onto the sensor area with the aid of the imaging system of the recording chamber. The sensor area is then displaced from reseau mesh to reseau mesh for the continuous recording.

These general methods are disclosed in German Pat. No. 3,428,325 incorporated herein by reference. If in this method a reseau plate covering the entire image format to be scanned is included in the imaging process, the partial-images created on the areas of the sensor blocks can be unambiguously numerically transformed into the plane of the reseau with the aid of the reseau points which are also imaged on the sensor areas within the capability of the digital image analysis system. In that case, the requirements for the physical position of the sensor blocks in the imaging space are only small and can be realized with little instrumentation effort: at least one mesh each of the reseau is also to be imaged onto the sensor areas to cover these areas; and the sensor areas are to be brought close enough to the reseau plane so that the points of the reseau, together with the object to be recorded, can be imaged with sufficient definition. Due to the transformation of the partial-images created on the image areas of the individual sensor blocks into the plane of the reseau, the total image format is obtained with high accuracy predetermined by the calibrated reseau plate.

Including a reseau in the imaging process permits, on the one hand, a high-accuracy flat-bed scanner to be constructed with little instrumentation effort. In addition, the possibility of combining into assemblies several sensor areas like a raster in an unambiguous mutual geometric relation provides the prerequisite for simultaneously picking up the entire area of an image format of, in principle, any size with simple instrumentation and, at the same time, high accuracy.

When using a flat-bed scanner for analog/digital conversion, the transparent master to be digitized is located underneath the reseau plate on a transparent base (for example, opal glass plate) and is imaged with transmitted light onto the sensor area. Sensor area and object to be imaged are carried from reseau mesh to reseau mesh for continuous exposure. By varying the magnification, the scanning rate can be changed, that is to say, the size of the image element in the master can be determined which is imaged onto a sensor element of the sensor block. In this arrangement, the mesh size and point marking density of the reseau must be matched (exchange of reseau plates).

The above-mentioned prior publication also shows the arrangement of a sensor block behind the image plane of a photogrammetrical recording system. The reseau points are imaged, together with the object to be recorded, onto the sensor area with the aid of the objective of the recording chamber. With a stationary recording arrangement, an individual sensor can be carried from reseau mesh to reseau mesh in the manner of a flat-bed scanner for continuous exposure in order to pick up the total format. Simultaneous pick up of the total format becomes possible if several sensor blocks, combined into several assemblies like a raster, are arranged behind a common reseau plate. The raster spacing of the sensor blocks in the assemblies is given, on the one hand, by the raster spacing of the reseau points and, on the other hand, will have to take into account that the light-sensitive areas of the sensor blocks, due to their construction, can only be arranged next to each other up to a certain minimum distance.

A more complete description of German Pat. No. 34 28 325 is set forth below.

Description of German Pat. No. 34 28 325

The German patent relates to an apparatus for the geometrically unique arrangement of optoelectric solid sensor surfaces (the image areas of which are smaller than the desired overall format) in a photogrammetric imaging system.

Optoelectric scanning is a prerequisite for digital image processing, either as analog/digital conversion of conventional analog photographic images or directly in optoelectric recording systems.

At the same time, photogrammetric evaluation of the digitized or digital images requires geometrically defined positions for the scanned gray-scale values.

In the case of optomechanical analog/digital conversion of analog survey photographs in the usual drum scanners, the guidance precision and dimesional accuracy of the scanning mechanics frequently meets photogrammetric requirements only unsatisfactorily (Ref. 1).

The usual rotational scanners used as optoelectronic recording systems for decades in remote sensing produce images which, in comparison with conventional survey photographs produced in surveying cameras, do not have any defined geometry and therefore can only be used photogrammetrically by using complex numerical rectification methods and with unavoidably limited accuracy (Ref. 2).

Due to the fixed linear arrangement of several sensor elements, line scanners offer better geometrical relationships than rotational scanners, but geometrical matching up of the individual lines still means increased effort and restricted accuracy compared with conventional survey photographs (Ref. 3).

Imaging systems with blocks of sensor elements combined as a solid surface can, on the one hand, reproduce in analog/digital conversion of analog survey photographs the geometrical characteristics of the master substantially error-free and would, on the other hand, make a combination of the geometrical advantages of a usual surveying camera and optoelectronic image generation possible in photogrammetric recording.

The commercially available sensor blocks developed for television engineering (CCD blocks) are, however, scarcely larger than 100 mm$^2$ and it will not be possible for a long time to develop and produce economically viable area-covering sensor blocks for the image formats usual in photogrammetry (up to 230×230 mm$^2$).

With commercially available surface sensors, image formats usual in photogrammetry can only by sensed in partial images which subsequently have to be joined together to form an overall image. For analog/digital conversion, this is already applied in practice in the manner of a flat-bet scanner, by an individual sensor surface being moved in a meandering manner over the master and continuously exposed. In order spatially to define the individual recording positions of the sensor surfaces geometrically uniquely thereby, high requirements have to be demanded of the mechanical guidance precision and positioning accuracy of the scanning system. So far, there are no solution proposals for the full-area simultaneous optoelectronic acquisition of large image formats by solid sensor surfaces which only cover part-areas.

Apparatus is herein disclosed which is designed in such a way that solid sensor surfaces, the image areas of which are smaller than the desired overall format, are arranged geometrically uniquely in a photogrammetric imaging system with low instrumentational expenditure. The solution is characterized in that the point array of a reseau covering the entire image format (glass plate with suitable grid-like distributed point markings) is incorporated into the imaging operation and the individual sensor surfaces are arranged in the imaging space in such a way that projection on a sensor surface includes at least one mesh of the reseau imaged over its full area so that the overall image is obtained in the plane of the reseau by numerical back projection of the partial images produced on the individual sensor surfaces into the respective reseau meshes.

If a reseau plate covering the entire image format to be sensed is incorporated in the imaging process, the partial images produced on the surfaces of the sensor blocks can, as part of the digital image evaluation, be numerically transformed uniquely into the plane of the reseau with the aid of the reseau points imaged in the projection on the sensor surfaces. Then only low requirements which can be fulfilled with little instrumentational expenditure are made on the physical position of the sensor blocks in the scanning space: projection on the sensor surfaces should include at least one mesh of the reseau imaged over its full area and the sensor surfaces should be brought so close to the reseau plane that the points of the reseau are focused sufficiently sharply together with the recording object (Ref. 4). By the transformation of the partial images produced on the image surfaces of the individual sensor blocks into the plane of the reseau the overall image format is obtained with high accuracy predetermined by the calibrated reseau plate.

A reseau in the imaging operation allows, on the one hand, the construction of a flat-bed scanner of high accuracy with low instrumentational expenditure and furthermore, due to the possibility of combining a plurality of sensor surfaces in a grid-like manner in unique mutual geometric relationship to form lattices, offers the preconditions for an instrumentationally simple and at the same time highly accurate nearly simultaneous overall acquisition of an image format of in principle any size.

The positions of the reseau markings in the digital partial images can be found automatically; proposals and detailed investigations on this already exist (Ref. 5).

Exemplary embodiments are explained below and diagrammatically illustrated.

FIG. 1 shows the principle of a flat-bed scanner for analog/digital conversion. The transport master to be digitized lies under the reseau plate on a light-transmitting base (e.g., opal glass plate) and is projected onto the sensor surface by transmitted light. For continuous exposure sensor surface and imaging lens are guided by a reseau mesh corresponding to FIG. 2. The scanning rate can be changed by variation of the imaging scale, that is to say the size of the image element (pixel) in the master which is projected onto a sensor element of the sensor block can be fixed. At the same time the reseau has to be adapted with regard to mesh width and point marking thickness (exchanging of the reseau plate).

FIG. 3 shows the arrangement of a sensor block behind the image plane of the photogrammetric recording system. The reseau points are projected onto the sensor surface jointly with the recording object with the aid of the lens of the recording camera. For acquisition of the overall format with a static recording arrangement, a single sensor can be guided from reseau mesh to reseau mesh corresponding to FIG. 2 for continuous exposure in the manner of a flat-bed scanner. A simultaneous acquisition of the overall format is possible if corresponding to FIG. 4 a plurality of sensor blocks combined in a grid-like manner in a plurality of lattices is arranged behind a joint reseau plate. The grid spacing of the sensor blocks in the lattices, on the one hand, predetermined by the grid spacing of the reseau points and, on the other hand, it must be taken into account that the light-sensitive surfaces of the sensor blocks can, due to their design, only be arranged next to one another to within a certain minimum distance.

FIG. 4 represents the case where the minimum distance is less than the side length of the sensor surfaces. Under these circumstances four sensor lattices are required for overall acquisition of the image format.

The recording lenses are displaced cyclically corresponding to FIG. 4 against the sensor lattices from lattice to lattice in order to achieve complete area coverage.

The references indicated above are as follows:

(1) Boochs, F., 1984.

A method for the production of digital elevation models from photogrammetric stereo models with the aid of planar correlation in digital images.

Dissertation Bonn.

(2) Rose, A. 1984.

Rectification of scanner recordings with prediction statements.
Dissertation Bonn.
(3) Hofmann, O., 1982.
Digital recording technique, photogrammetric surveying and aerial photography.
1/82 pages 16-32.
(4) German Patent office specification No. 1,279,342: Reseau arrangement in aerial surveying cameras.
(5) Mikhail, E., 1984.
Photogrammetric Target Location to Subpixel Accuracy in Digital Images.
University of Stuttgart Institute of Photogrammetry Issue 9, 1984.

As further background, the reader is directed to the following publications incorporated herein by reference.

Literature references

Helava, 1956, New principles in photogrammetry. Photogrammetria.
Luhmann, T., Calibration of a digital recording system. German Geodetic Commission, series C, No. 275, 1985.
Luhmann, T., Automatic point determination in a reseau scanning system. Symposium ISPRS Commission V, Ottawa, 1986.
Luhmann, T., A method for rotation-invariant point determination. Bildmessung und Luftbildwesen, 1986.
Luhmann, T., Wester-Ebbinghaus, W., Rolleimetric RS-A new system for digital image processing. Symposium ISPRS Commission II, Baltimore, 1986.
Luhmann, T., Wester-Ebbinghaus, W., Photogrammetric data acquisition using the digital reseau scanning system Rolleimetric RS. Symposium ISPRS Commission I, Stuttgart, 1986.
Luhmann, T., Wester-Ebbinghaus, W., High resolution digital image scanning with optical-numerical sensor orientation. In Hartmann, G. (editor): 8th DAGM Symposium Paderborn 1986, Springer Verlag, 1986.
Wester-Ebbinghaus, W., 1985, Beam triangulation with combined equalization of photogrammetric and geodetic observations. Zeitschrift fur Vermessungswesen, 3/85.
Wester-Ebbinghaus, W., 1986, CCD Reseau scanning—a new principle for digital image processing. The Symposium of Commission I of the International Society for Photogrammetry and Remote Sensing, Stuttgart.
Wester-Ebbinghaus, W., 1984, Opto-electrical solids—area sensors in the photogrammetric imaging system. Bildmessung und Luftbildwesen, 6384.

SUMMARY OF THE INVENTION

It is therefore an object of the present invention to provide an improved method for the photogrammetrical pick up of an object. In accordance with the invention, a method is disclosed for the photogrammetrical pick up of an object, comprising the steps of: (a) providing a transparent master having present thereon an image in analog form; (b) covering the entire image with a reseau having a predetermined point array marked thereon on which divides the reseau into a pattern of discrete, contiguous meshes, defined by a coordinate system; (c) serially imaging, at least one mesh at a time, the reseau and the image area underlying each mesh to provide a series of partial analog images including the reseau points and analog image portions from each mesh; (d) opto-electrically converting from analog to digital the analog images of said partial-images to provide corresponding digital partial-images which include the reseau points; (e) correlating the reseau points in each of said digital partial-images with the predetermined positions of said points in said point array to provide transforming parameters; and (f) converting the digital partial-images into a total image by applying said transformation parameters.

BRIEF DESCRIPTION OF THE DRAWINGS

This method for the digital conversion of analog master images is explained in greater detail with the aid of the block diagrams in the figures of the drawing:

FIGS. 1-4 are taken from German Pat. No. 34 28 325 in which:

FIG. 1 shows an apparatus for the analog/digital conversion of a transparent master. The master (film) is in contact with the reseau plate and is projected onto the sensor surface jointly with the reseau by transmitted light via an optical system.

FIG. 2 shows a diagram for the continuous exposure of a sensor surface following the grid predetermined by the reseau.

FIG. 3 shows an arrangement of a sensor surface behind a reseau plate fitted in the imaging plane of a recording camera. The reseau is projected onto the sensor surface jointly with the recording object with the aid of the projection center of the recording camera.

FIG. 4 shows a diagram for the grid-like arrangement of a plurality of sensor surfaces in a plurality of lattices for a full-area simultaneous acquisition of an image format. The sensor lattices and the projection centers are cyclically displaced mutually from lattice to lattice corresponding to the grid spacing in the lattices.

FIGS. 5 to 13, the individual steps of the various methods according to the invention are in each case shown in a block diagram, wherein:

FIG. 5 shows a method for the digital conversion of analog master images;

FIG. 6 shows a method for the digital monoscopic image measurement;

FIG. 7 shows a method for the digital stereoscopic image measurement with control of the object point;

FIG. 8 shows a method for the digital automatic monoscopic image measurement;

FIG. 9 shows a method for the digital automatic image measurement with simultaneous multi-image point recognition;

FIG. 10 shows a method for the digital monoscopic image recording and image measurement;

FIG. 11 shows a method for the digital monoscopic image recording and image measurement with selectable image element size;

FIG. 12 shows a method for the digital stereoscopic image recording and image measurement;

FIG. 13 shows the data flow for recording a partial-image as a function of the processing time in a double-exposure method.

DETAILED DESCRIPTION OF THE PREFERRED EMBODIMENTS

Figure 1:
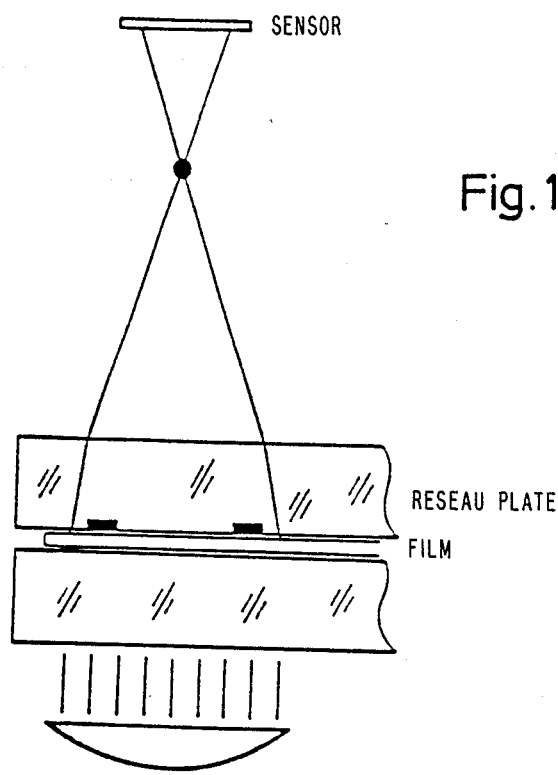
Figure 2:
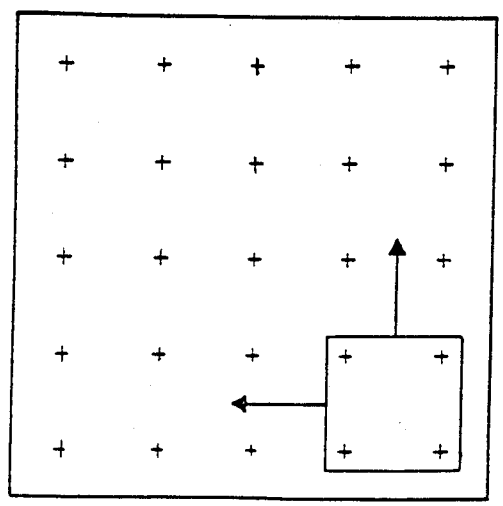
Figure 3:
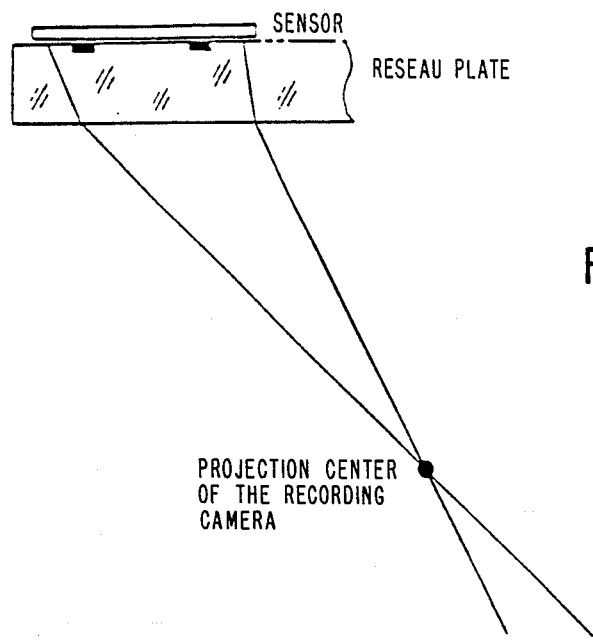
Figure 4:
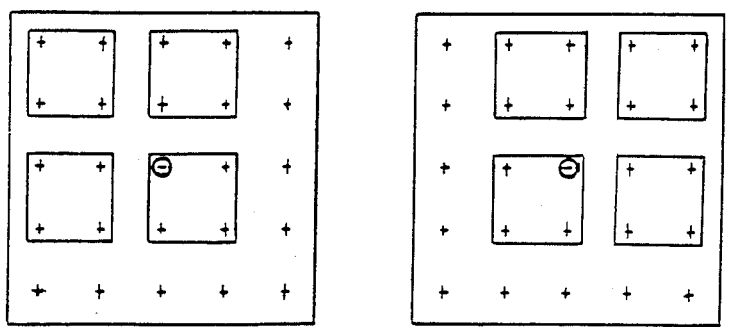
Figure 4:
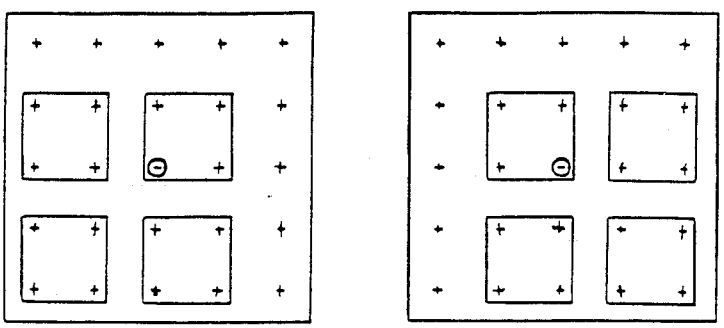

The following tables 5-14 correspond to FIGS. 5-14 and set forth a description of the various blocks and elements shown within each corresponding figure where like numbers refer to like elements.

TABLE 5

| | | |
|---|---|---|
| 1 | = | Analog master image |
| 2 | = | Scanning reseau |
| 3 | = | Opto-electric solid-state surface sensor |
| 4 | = | Sensor control |
| 5 | = | Image pick up |
| 6 | = | Storage Digital partial-image Transformation parameters |
| 7 | = | Partial-image |
| 8 | = | Recognition of reseau points |
| 9 | = | Reseau coordinates in the system of the partial-image |
| 10 | = | Fitting the reseau points imaged in the partial-image to the scanning reseau |
| 11 | = | Coordinates of the scanning reseau |
| 12 | = | Transformation parameters Partial-image - scanning reseau |
| 13 | = | Rectification |
| 14 | = | Storage Digital total image |

TABLE 6

| | | |
|---|---|---|
| 1 | = | Analog master image |
| 2 | = | Scanning reseau |
| 3 | = | Opto-electric solid-state surface sensor |
| 4 | = | Sensor control |
| 5 | = | Image pick up |
| 7 | = | Partial-image |
| 8 | = | Recognition of reseau points |
| 9 | = | Reseau coordinates in the system of the partial-image |
| 10 | = | Fitting the reseau points imaged in the partial-image to the scanning reseau |
| 11 | = | Coordinates of the scanning reseau |
| 12 | = | Transformation parameters Partial-image - scanning reseau |
| 15 | = | Transformation of the image points into the coordinate system of the scanning reseau |
| 16 | = | Input Image coordinates in the system of the partial-image |
| 17 | = | Display screen |
| 18 | = | Input Reseau mesh |
| 19 | = | Storage Image coordinates |
| 20 | = | Image coordinates in the system of the scanning reseau |

TABLE 7

| | | |
|---|---|---|
| 1 | = | Analog master images |
| 2 | = | Scanning reseaus |
| 3 | = | Opto-electric solid-state surface sensors |
| 4 | = | Sensor control |
| 5 | = | Image pick up |
| 7 | = | Partial-images |
| 8 | = | Recognition of reseau points |
| 9 | = | Reseau coordinates in the system of the partial-images |
| 10 | = | Fitting the points of the scanning reseaus to the reseau points imaged in the partial-images |
| 11 | = | Coordinates of the scanning reseaus |
| 12a | = | Transformation parameters Scanning reseau - partial-image |
| 15 | = | Transformation of the image points into the coordinate systems of the scanning reseaus |
| 20 | = | Image coordinates in the systems of the scanning reseaus |

TABLE 7-continued

| | | |
|---|---|---|
| 21 | = | Transformation of the image points into the coordinate systems of the partial-images |
| 22 | = | Measurement mark coordinates in the systems of the partial-images |
| 23 | = | Stereo display screen |
| 24 | = | Transformation parameters Image system of the recording chamber - scanning reseau |
| 25 | = | Image coordinates in the system of the recording |
| 26 | = | Projection |
| 27 | = | Orientation parameters of the recording chambers |
| 28 | = | Mapping |
| 29 | = | Input Object coordinates |
| 30 | = | Storage Object coordinates |

TABLE 8

| | | |
|---|---|---|
| 1 | = | Analog master image |
| 2 | = | Scanning reseau |
| 3 | = | Opto-electric solid-state surface sensor |
| 4 | = | Sensor control |
| 5 | = | Image pick up |
| 7 | = | Partial-image |
| 8 | = | Recognition of reseau points |
| 9 | = | Reseau coordinates in the system of the partial-image |
| 10 | = | Fitting the reseau points imaged in the partial-image to the scanning reseau |
| 11 | = | Coordinates of the scanning reseau |
| 12 | = | Transformation parameters Partial-image - scanning reseau |
| 12a | = | Transformation parameters Scanning reseau - partial-image |
| 12b | = | Transformation parameters Aux. system - scanning reseau |
| 15(15') | = | Transformation of the image points into the coordinate system of the scanning reseau |
| 16 | = | Image coordinates in the system of the partial-image |
| 20 | = | Image coordinates in the system of the scanning reseau |
| 21 | = | Transformation of the image points into the coordinate system of the partial-image |
| 41 | = | Storage Image coordinates |
| 42 | = | Approximated image coordinates in the system of the partial-image |
| 43 | = | Approximated image coordinates in the system of the scanning reseau |
| 44 | = | Input Approximated image coordinates in an aux. system |

TABLE 9

| | | |
|---|---|---|
| 1 | = | Analog master images |
| 2 | = | Scanning reseaus |
| 3 | = | Opto-electric solid-state surface sensors |
| 4 | = | Sensor control |
| 5 | = | Image pick up |
| 7 | = | Partial-images |
| 8 | = | Recognition of reseau points |
| 9 | = | Reseau coordinates in the system of the partial-images |
| 10 | = | Fitting the reseau points imaged in the partial-images to the scanning reseaus |
| 11 | = | Coordinates of the scanning reseaus |
| 12 | = | Transformation parameters Partial-image - scanning reseau |

TABLE 9-continued

| | | |
|---|---|---|
| 12a | = | Transformation parameters Scanning reseau - partial-images |
| 12b | = | Transformation parameters Aux. system - scanning reseau |
| 15(15') | = | Transformation of the image points into the coordinate systems of the scanning reseaus |
| 16 | = | Image coordinates in the system of the partial-images |
| 20 | = | Image coordinates in the system of the scanning reseaus |
| 21 | = | Transformation of the image points into the coordinate systems of the partial-images |
| 41 | = | Storage Image coordinates |
| 42 | = | Approximated image coordinates in the systems of the partial-images |
| 43 | = | Approximated image coordinates in the systems of the scanning reseaus |
| 44 | = | Input Approximated image coordinates in auxiliary systems |

TABLE 10

| | | |
|---|---|---|
| 3 | = | Opto-electric solid-state surface sensor |
| 4 | = | Sensor control |
| 5 | = | Image pick up |
| 6 | = | Display screen |
| 7 | = | Partial-image |
| 8 | = | Recognition of reseau points |
| 9 | = | Reseau coordinates in the system of the partial-image |
| 10c | = | Fitting the reseau points imaged in the partial-image to the chamber reseau |
| 11c | = | Coordinates of the chamber reseau |
| 12c | = | Transformation parameters Partial-image - chamber reseau |
| 16 | = | Input Image coordinates in the system of the partial-image |
| 19 | = | Storage Image coordinates |
| 51 | = | Input Reseau mesh |
| 52 | = | Image coordinates in the system of the chamber reseau |
| 55 | = | Reseau recording chamber |
| 56 | = | Transformation of the image points into the coordinate system of the chamber reseau |

TABLE 11

| | | |
|---|---|---|
| 3 | = | Opto-electric solid-state surface sensor |
| 4 | = | Sensor control |
| 5 | = | Image pick up |
| 6 | = | Display screen |
| 7 | = | Partial-image |
| 8 | = | Recognition of reseau points |
| 9 | = | Reseau coordinates in the system of the partial-image |
| 10c | = | Fitting the reseau points imaged in the partial-image to the chamber reseau |
| 11c | = | Coordinates of the chamber reseau |
| 12c | = | Transformation parameters Partial-image - chamber reseau |
| 16 | = | Input Image coordinates in the system of the partial-image |
| 19 | = | Storage Image coordinates |
| 50 | = | Transformation of the image points into the coordinate system of the chamber reseau |

TABLE 11-continued

| | | |
|---|---|---|
| 51 | = | Input Reseau mesh |
| 52 | = | Image coordinates in the system of the chamber reseau |
| 55 | = | Reseau recording chamber |
| 57 | = | Field Lens |

TABLE 12

| | | |
|---|---|---|
| 4 | = | Sensor control |
| 5 | = | Image pick up |
| 7 | = | Partial-images |
| 8 | = | Recognition of reseau points |
| 9 | = | Reseau coordinates in the system of the partial-images |
| 10d | = | Fitting the points of the chamber reseaus to the reseau points imaged in the partial-images |
| 11c | = | Coordinates of the chamber reseaus |
| 12d | = | Transformation parameters Chamber reseau - partial-image |
| 21 | = | Transformation of the image points into the coordinate systems of the partial-images |
| 22 | = | Measuring mark coordinates in the systems of the partial-images |
| 23 | = | Stereo display screen |
| 26 | = | Projection |
| 27 | = | Orientation parameters of the recording chambers |
| 28 | = | Mapping |
| 29 | = | Input Object coordinates |
| 30 | = | Storage Object coordinates |
| 52 | = | Image coordinates in the systems of the chamber reseaus |
| 60 | = | Reseau recording chambers with opto-electric solid-state surface sensors for pick up of partial-images |

TABLE 13

| | | |
|---|---|---|
| 70 | = | Image register 1 |
| 71 | = | Determination of reseau points and transformation |
| 72 | = | Evaluation of object imaged |
| 73 | = | Image register 2 |
| 74 | = | Image recording A/D conversion |
| 75 | = | Image recording A/D conversion |
| 76 | = | Illumination of the reseau points |

TABLE 14

| | | |
|---|---|---|
| 80 | = | Projection center of the reseau image |
| 81 | = | Projection center of the recording chamber |
| 82 | = | Chamber reseau |
| 83 | = | Opto-electric solid-state surface sensor in the imaging plane of the recording chamber |

Figure 5:
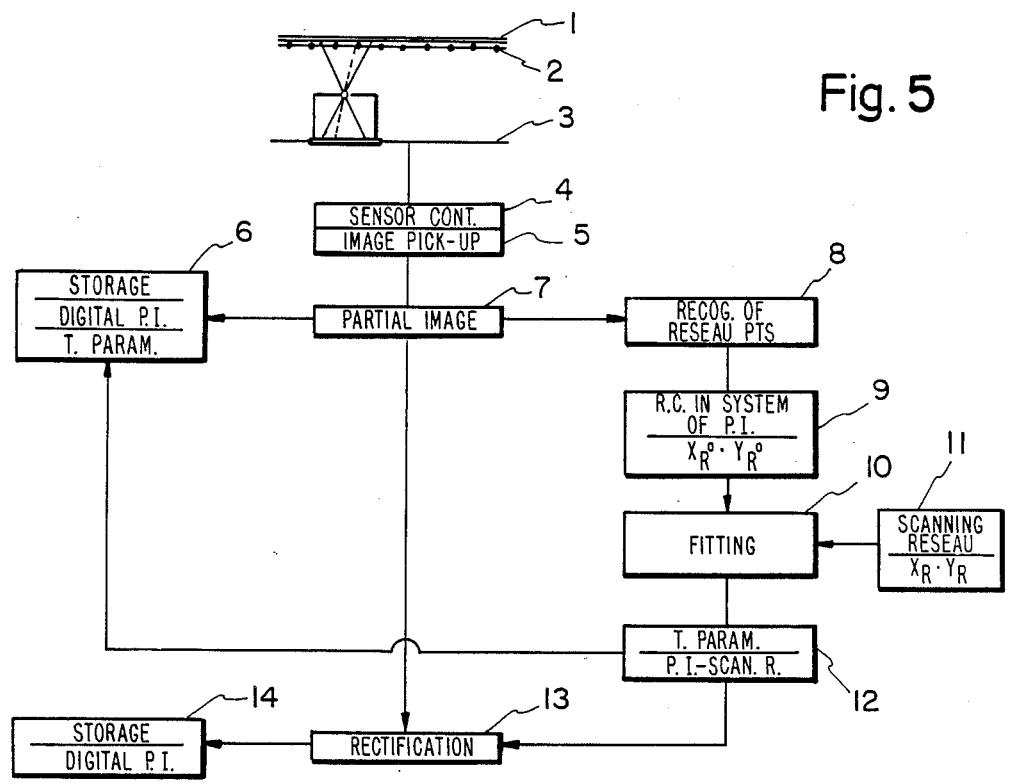

In reference to FIG. 5, for example, the reseau points in the digital partial image are recognized in block 8 by a computational line and edge analysis in which the zero points of the first derivative of the image function are sought. This is done by standard methods of digital image processing which approximate the first derivative by means of a convolution with so-called gradient operators (gradient masks) (See, for example, the above-cited references of Luhmann 1986). The line points belonging to a beam of the reseau cross are in each case linked by an equalizing straight line whose point of intersection yields the center point of the reseau cross. The measurement is done completely automatically.

The transformation of the reseau point coordinates determined in the partial image to the coordinates given in the scanning reseau system as indicated in block 12 is either affine $$X_{rs} = a_0 + a_1 x_t + a_2 y_t$$
$$Y_{rs} = b_0 + b_1 x_t + b_2 y_t$$

or projective $$\frac{a_0 + a_1 x_t + a_2 y_t}{1 + c_1 x_t + c_2 y_t}$$

$$\frac{b_0 + b_1 x_t + b_2 y_t}{1 + c_1 x_t + c_2 y_t}$$

where $X_{rs}$, $Y_{rs}$ are the coordinates in the scanning reseau system (metric system); $X_t$, $Y_t$ are the coordinates in the digital partial image (pixel system); and a, b, c are the transformation parameters. The coordinates of the reseau points given in the reseau scanning system are available as calibrated reference coordinates.

In digital image processing, "rectification" as indicated in block 13 is understood to mean the correction of an image with given geometrical transformation parameters (mapping function). In this connection all the partial images (each is located in its own local coordinate system) are corrected by means of the transformation set forth above to a standard coordinate system.

In the method shown in FIG. 5, the transformation parameters can be stored together with the digital partial-image or used for combining the partial-images by rectification to form a digital total image.

In a digital monoscopic image measuring system, it is advantageous if, after selection of a reseau mesh containing the image points to be measured, the associated partial-image is displayed on a display screen and that, in this display, image coordinates are measured which, together with the transformation parameters obtained from the reseau fitting or correlation, are transformed into the coordinate system of the scanning reseau. This method is visually illustrated in FIG. 6.

In a digital automatic monoscopic image measuring system, the system can basically operate in accordance with the principle of FIG. 5. However, it is advantageous if the automatic point registration process carried out by digital processing of the partial-images is supported by additionally provided approximated image coordinates in the system of the partial-image which are entered into an auxiliary system and are transformed into the coordinate system of the scanning reseau to steer by this means the surface sensor over reseau meshes which contain the image points to be determined and which are finally transformed into the system of the partial-image detected by the surface sensor. This method is explained in FIG. 8.

Figure 8:
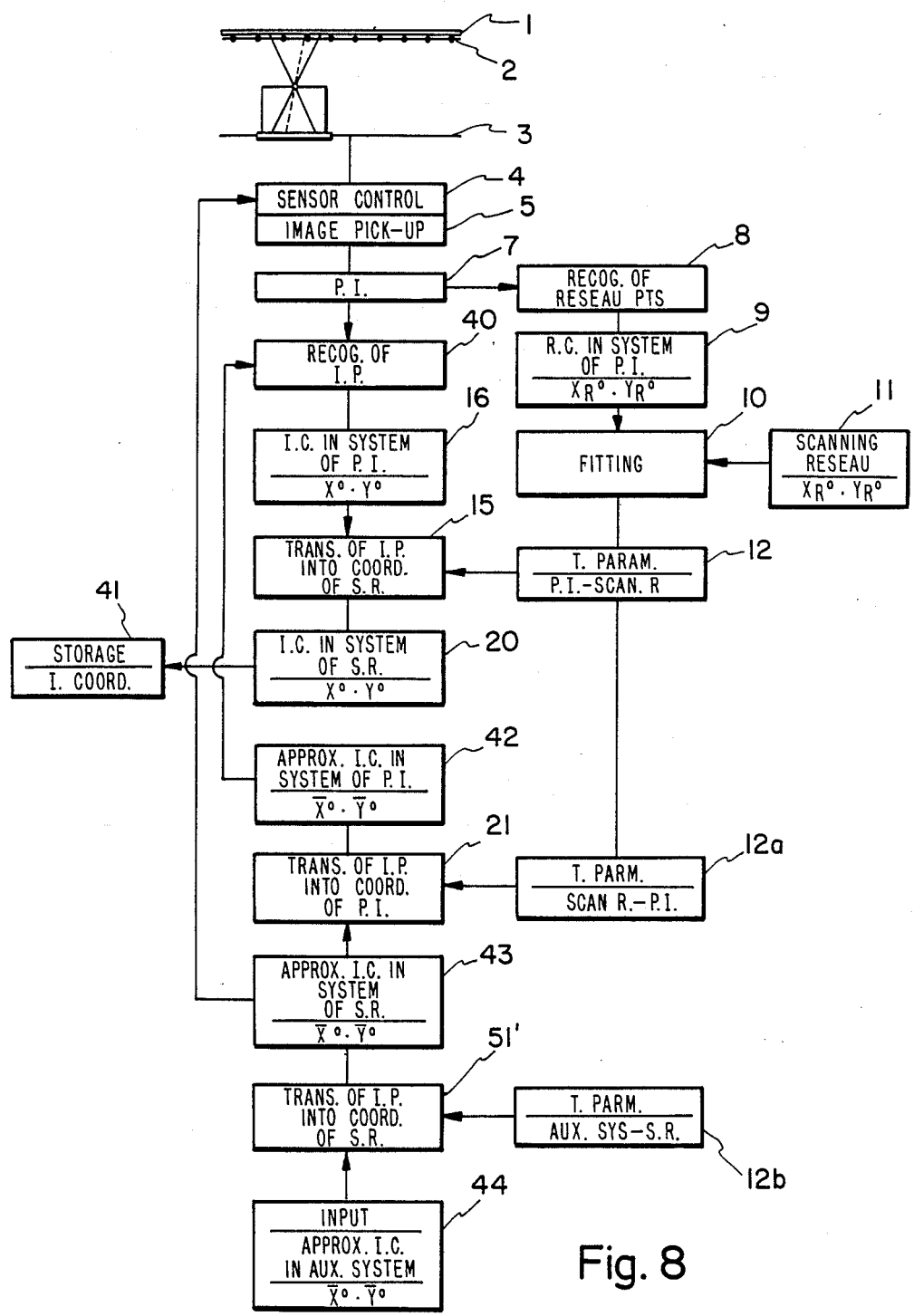
Figure 9:
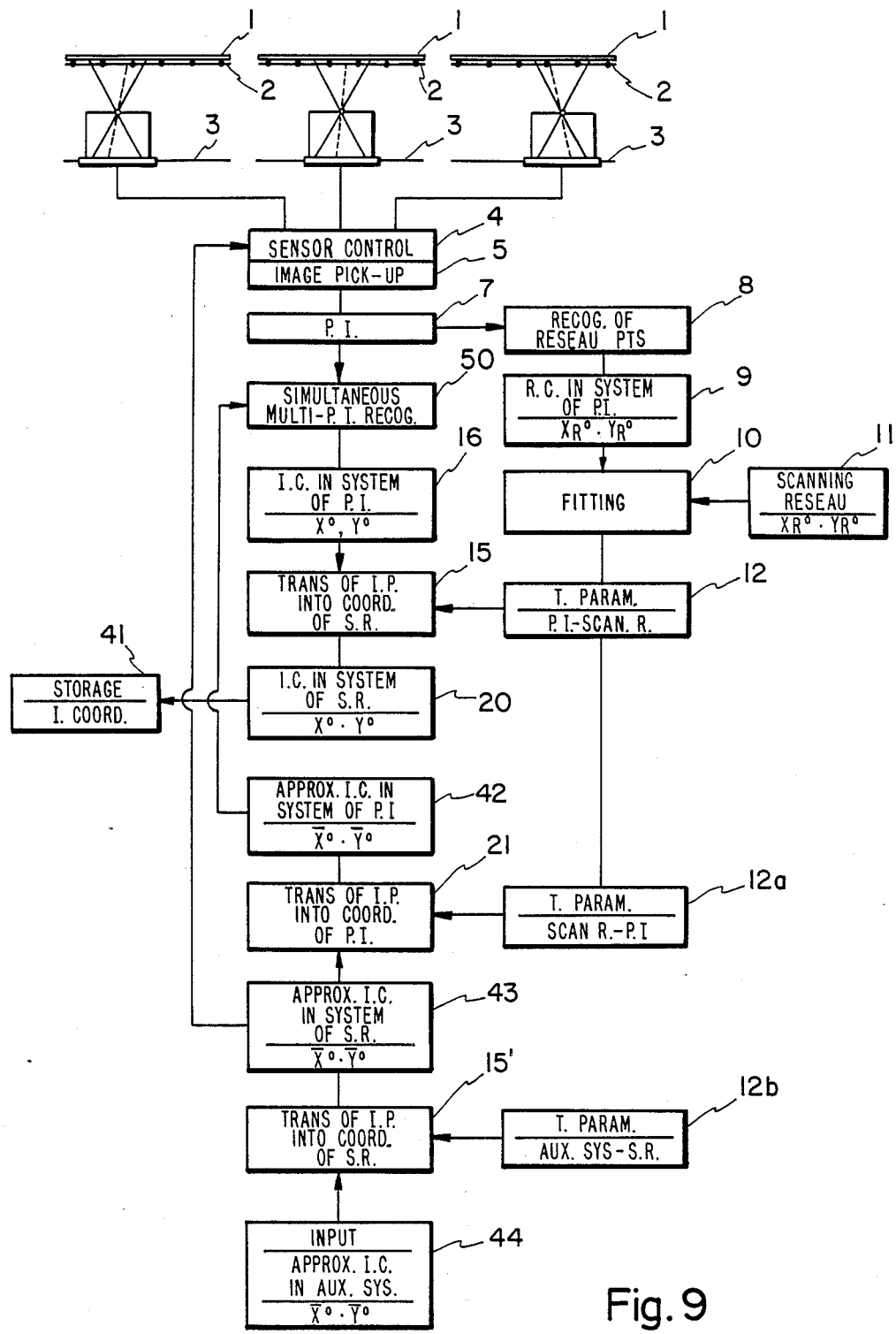

A method operating in accordance with FIG. 8 can also be simultaneously carried out for several analog master images. For this purpose, FIG. 9 shows the use of three analog master images in conjunction with three scanning graticules.

In conjunction with the method initially explained in the introduction to the description, a method has been provided in accordance with the invention for digital stereo image measurement. For this purpose, two analog master images are brought into contact with one scanning reseau each, and one opto-electric solid-state surface sensor each is displaced, together with one imaging optics system each, above and/or below and in parallel therewith, manually or by means of a predetermined program to process the master images mesh by mesh. The image coordinates computed from entered object coordinates with the aid of the orientation parameters of the recording chamber are transformed into the systems of the two scanning reseaus in order to steer the two surface sensors to the affected reseau meshes of the two images and thus stereoscopically display on a stereo display screen the corresponding partial area of the object. In this way, the measuring marks of the stereo display screen can be carried or incorporated into the systems of the partial-images to the image points corresponding to the object point entered.

Figure 7:
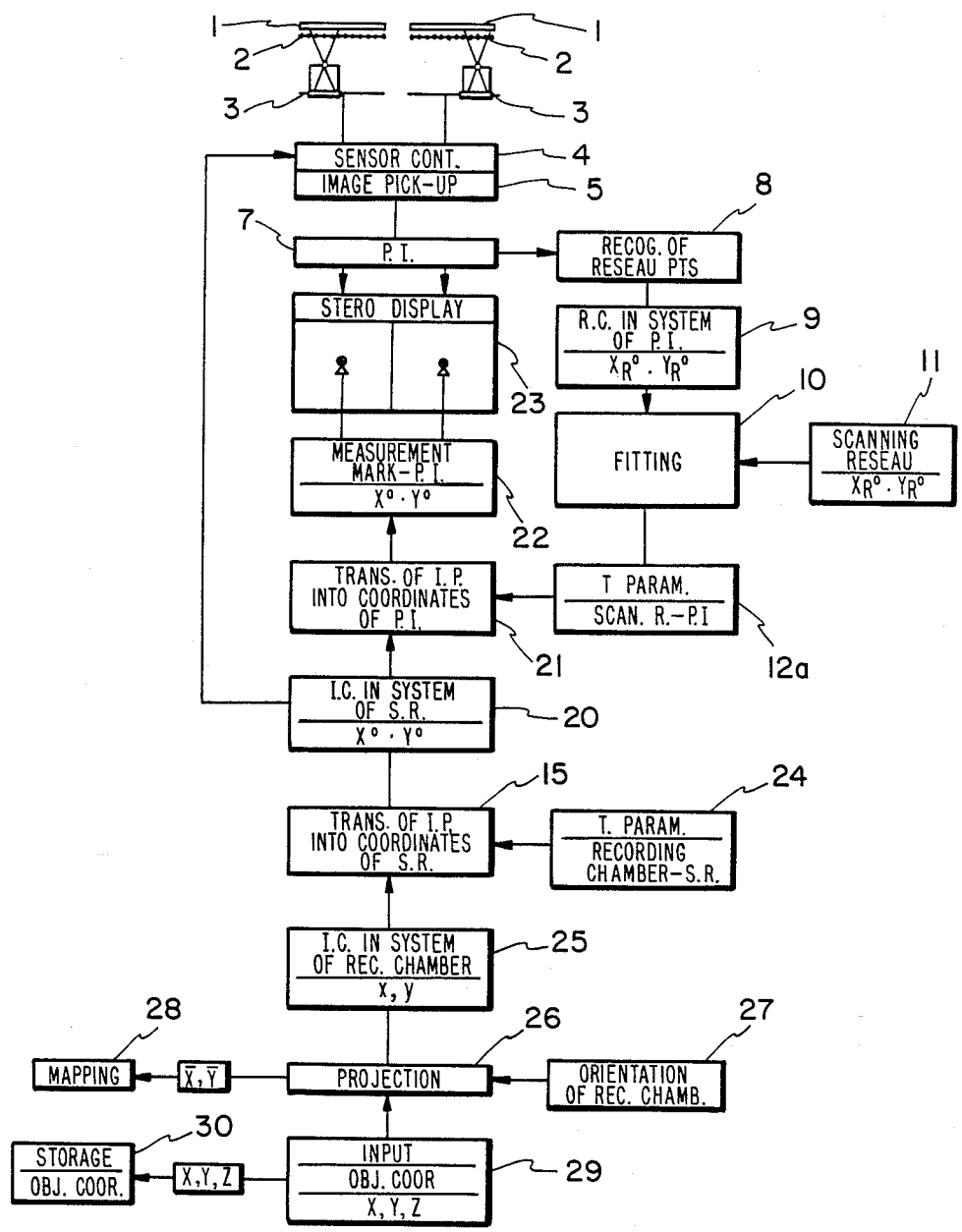

This type of digital stereoscopic image measurement with control of the object point is shown in FIG. 7. This measuring principle basically corresponds to the analytic plotter; it permits dynamic spatial measurement in a stereoscopically implemented model and supplies on-line mapping (stereomapping) or spatial object coordinates.

With reference to FIG. 7 as well as FIGS. 6, 10, 11 and 12, the image measurement is carried out in the field of the picture elements appearing on the viewing screen by bringing a cursor consisting of a picture element or a cursor suitably composed of several picture elements by hand control to the image points to be measured and recording the position of this cursor in the field of the picture elements by the column and row numbers of the area sensor system. The detection of image points in FIGS. 8 and 9, on the other hand, is carried out automatically by methods of digital image processing (Luhmann 1986).

The orientation parameters of the recording chamber (block 27 of FIG. 7) describe the position of the projection center in the image space (internal orientation and the position of the projection center and the rotation of the recording chamber in the object (external orientation). The sequence shown in FIG. 7 (and FIG. 12) assumes that these parameters are provided by a normal photogrammetric orientation process (see, for example, beam triangulation, Wester-Ebbinghaus, 1985).

On the measurement images, markings are visible which define the image space reference system of the recording chamber and which have been impressed on the image during exposure by cursors permanently associated with the chamber. On imposing the measurement images on the scanning reseau, it is not necessary to bring the image space reference system and reseau into unambiguous mutual registration so that a numerical transformation is performed as set forth above.

Figure 12:
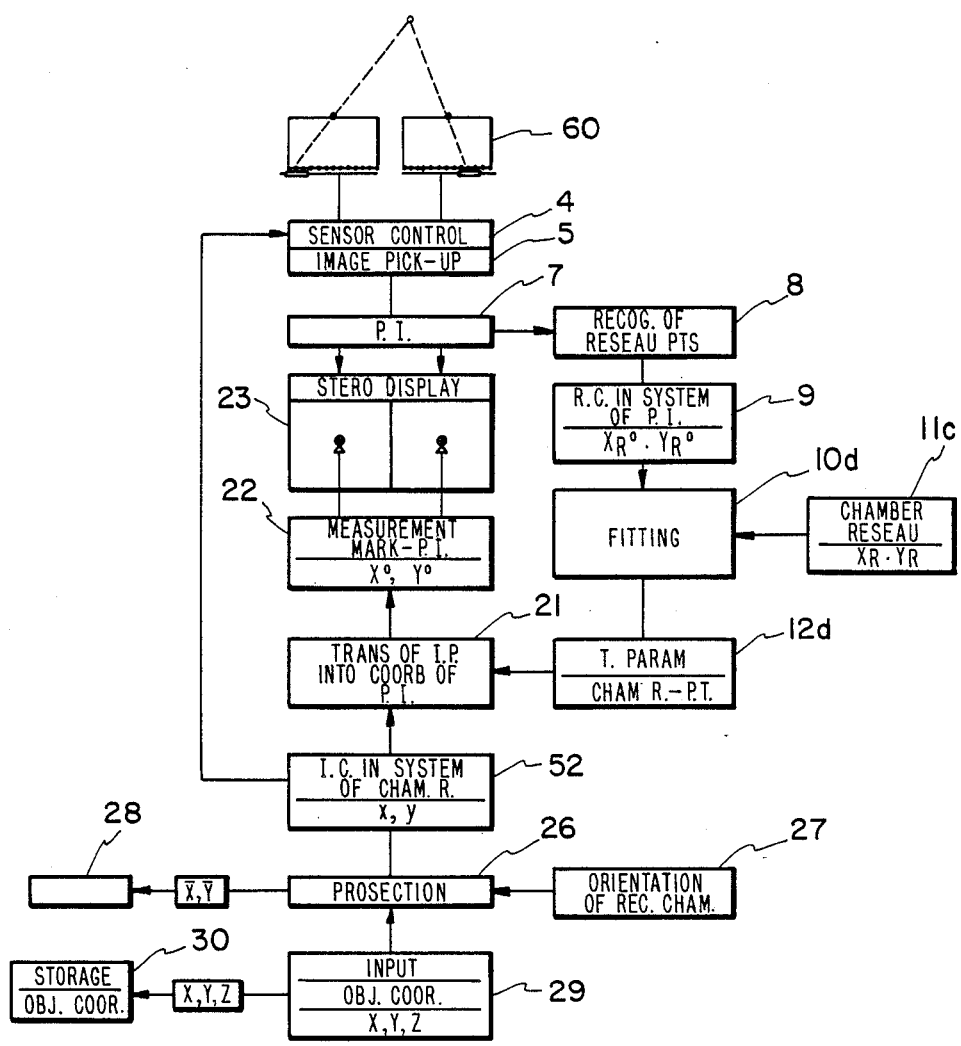
Figure 14:
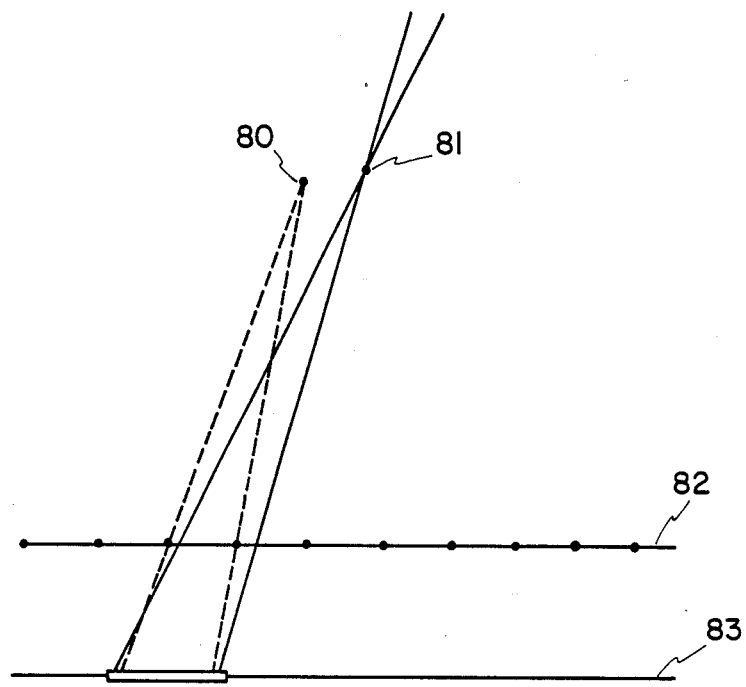
FIG. 14 shows a modified method according to FIGS. 10 and 12.

Input parameters of the arrangement shown in block 29 of FIGS. 7 and 12 are spatial coordinates X, Y, Z in the object reference system. These are transformed into the image space (central projection using the orientation parameters) in order to present uniform measurement cursors on the corresponding image points to the operator in sections of the images for stereoscopic examination. In the physical and psychic process of spatial viewing, these image sections merge for the observer into a spatial model of the object and he perceives the two measurement cursors as a virtual spatial cursor on the object point which corresponds to the image points. X, Y, Z are the coordinates of the object point at which the operator stereoscopically sees the virtual spatial measurement cursor. By altering the input parameters he can guide the measurement cursor as required in the object space while viewing stereoscopically and consequently indirectly obtain object coordinates X, Y, Z in the form of the input parameters for the object points focused on. This principle corresponds to the analytical plotter as described in the above reference by Heleva (1956).

The object coordinates X, Y, Z obtained above can be filed directly as a measurement result (block 30) or projected (block 26) on a plotting plane with any orientation in the space (X, Y) (block 28).

In conjunction with the method explained secondly in the introduction to the description, a method has been provided in accordance with the invention in which, after selection of a reseau mesh containing the image points to be measured, the associated partial-image is displayed on a display screen and in this display image coordinates are measured which are transformed, together with the transformation parameters obtained from the fitting of the reseau points on the chamber reseau which are imaged in the partial-image, into the coordinate system of the chamber reseau.

Figure 10:
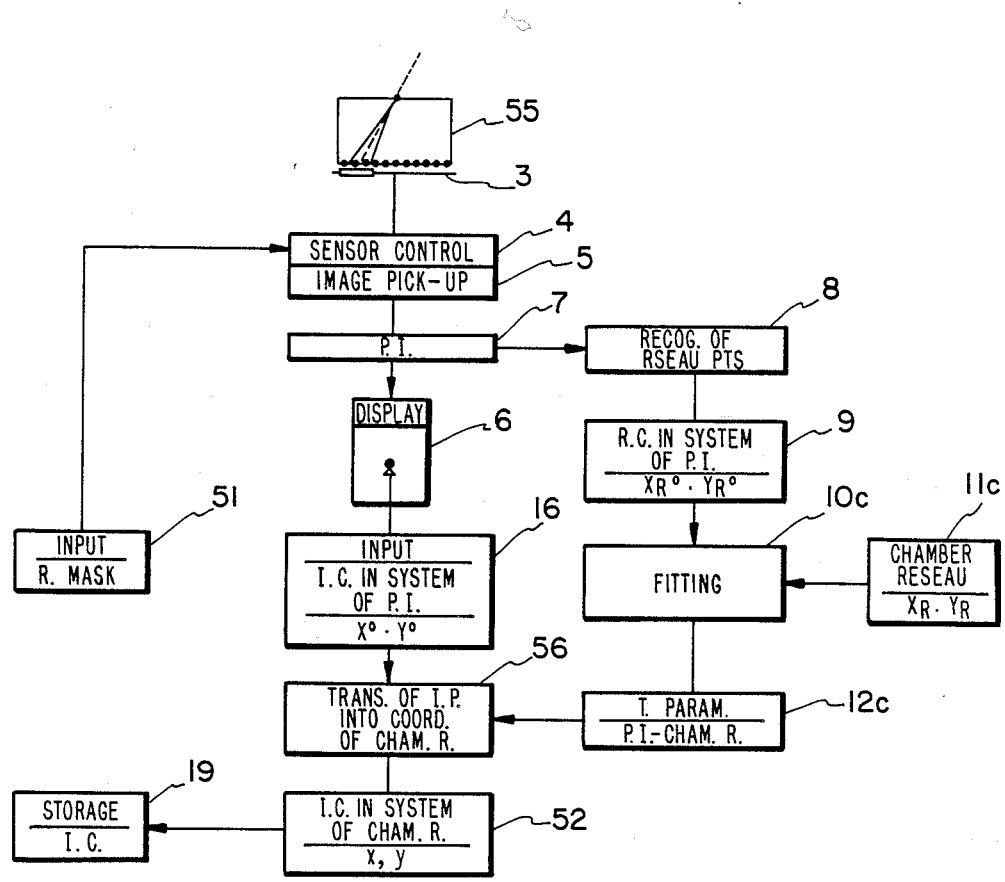
Figure 11:
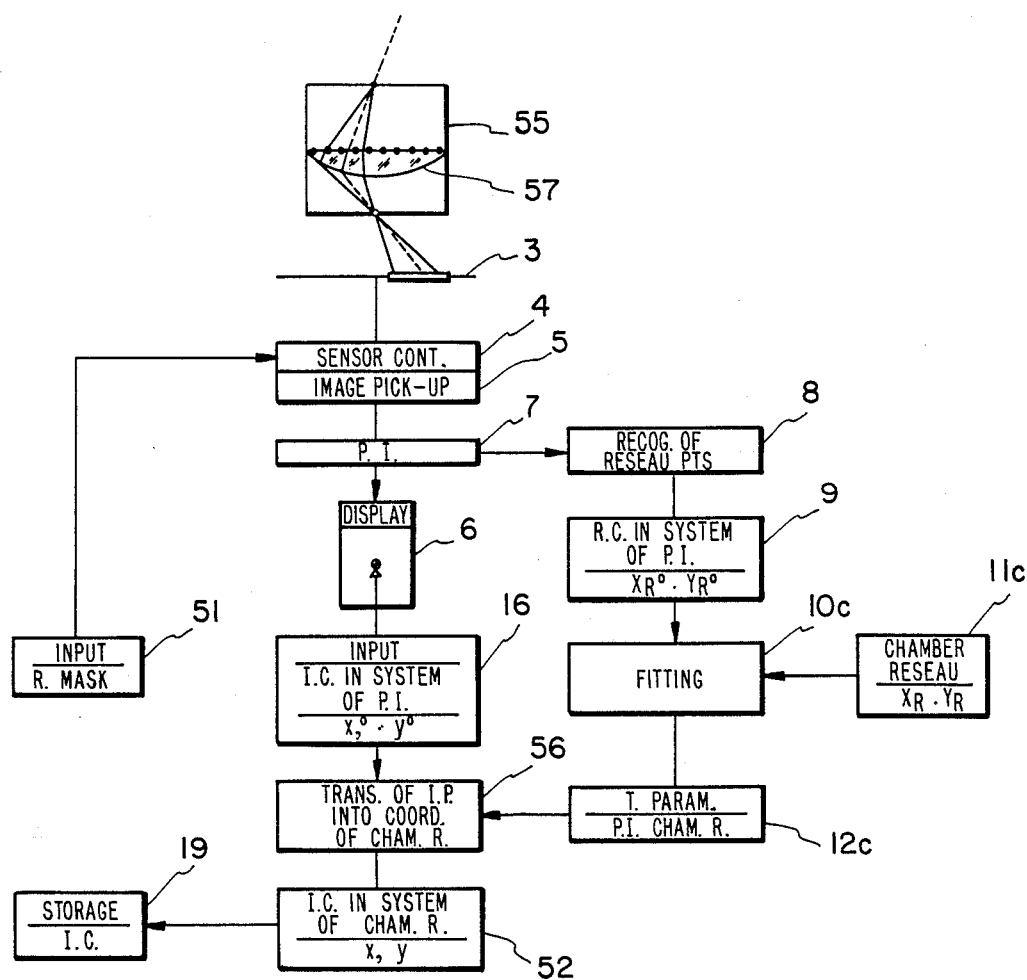

This digital monoscopic image recording and image measuring system is explained in FIG. 10. In principle, the system corresponds to that of FIG. 6, except that the surface sensor is carried behind a reseau plate mounted in the image plane of the recording chamber.

To make the image element size selectable in the digital monoscopic image recording and image measuring system according to FIG. 10, it is advantageous if the object image created in the recording chamber, together with the chamber reseau, is imaged a second time, and the surface sensor is provided in this second imaging area in order to thus vary the magnification of the digital image. Similar to the system shown in FIG. 5, the size of the sensor elements can thus be accommodated to image elements of different sizes in the image system of the recording chamber.

In a digital stereoscopic image recording and image measuring system, a method has been provided in accordance with the invention for digital stereoscopic image measurement, in conjunction with the method explained secondly in the introduction to the description. For this purpose, two reseau recording chambers are used, and the image coordinates computed from entered object coordinates with the aid of the orientation parameters of the recording chambers are transformed into the coordinate systems of the partial-images in order to steer the two surface sensors to the affected reseau meshes of the two images and thus stereoscopically display on a stereo display screen in the corresponding partial area of the object. In this way, the measurement marks of the stereo display screen can then be carried or incorporated into the system of the partial-images to the image points corresponding to the object points.

In principle, the system corresponds to that of FIG. 7, except that the surface sensor is carried behind a reseau plate mounted in the imaging plane of the recording chamber. Since the system of the chamber reseau at the same time represents the image space system, the image coordinates obtained from object points can be directly used for controlling the scanning and measuring systems; in contrast with the method according to FIG. 7, therefore, no transition from the chamber system to the system of a scanning reseau is required.

Since the sensor is positioned by optical means, the reseau points must be designed in such a manner that they can be measured with the greatest possible accuracy. Black, right-angled crosses can be determined with an accuracy of 1 to 3 $\mu$m with present-day correlation and pattern recognition methods. This accuracy can be reliably achieved only if the reseau points can be unambiguously separated from the background. But if reseau point and object have the same optical density, the point cannot be identified and the sensor can thus not be positioned.

The separation of reseau and image information can be numerically performed if the signal intensity of the reseau point is significantly different from that of the background, that is to say the difference in gray values is greater than the noise component in the image. The greater the noise component in the image and the more inhomogeneous the background, the lower the accuracy of the point determination.

To avoid the disadvantages mentioned, an optical separation of object and reseau by double exposure is proposed in accordance with the invention. The reseau points are first imaged by the surface sensor with a separate external illumination, without the object information being visible. The first sensor image obtained in this manner is digitally stored, the object having the same geometric relation to the reseau is then imaged, and the second sensor image obtained in this manner is also digitally stored.

In this arrangement, it is advantageous if in the first image, displaying only the reseau points, the point determination for sensor positioning and then the geometric evaluation of the object image are carried out and if, during the evaluation of the second sensor image, the measured image coordinates are directly specified in the coordinate system of the reseau by the transformation parameters found.

To allow the reseau points to be imaged separately by the sensor without allowing the object information to become visible at the same time, the use of reflecting points is advantageous which can be caused to emit light by means of side light or incident light. If semi-transparent reseau points are used, the object can be imaged largely undisturbed by the reseau during the second exposure.

The geometric relation between the images of the reseau and of the object is known only if the sensor has not changed in the time between the recordings. The cycle time must therefore be as short as possible. Commercially available CCD video cameras and analog/-digital converters operate with a frequency of 1/30 of a second. This cycle time can be achieved if two image registers and suitable illumination control is used.

Figure 13:
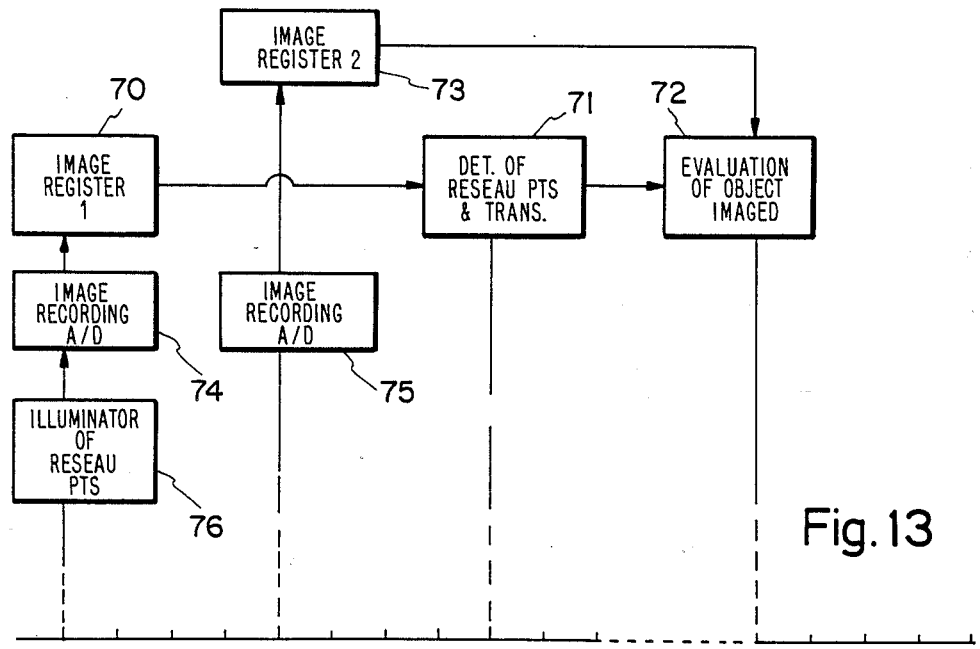
Figure 6:
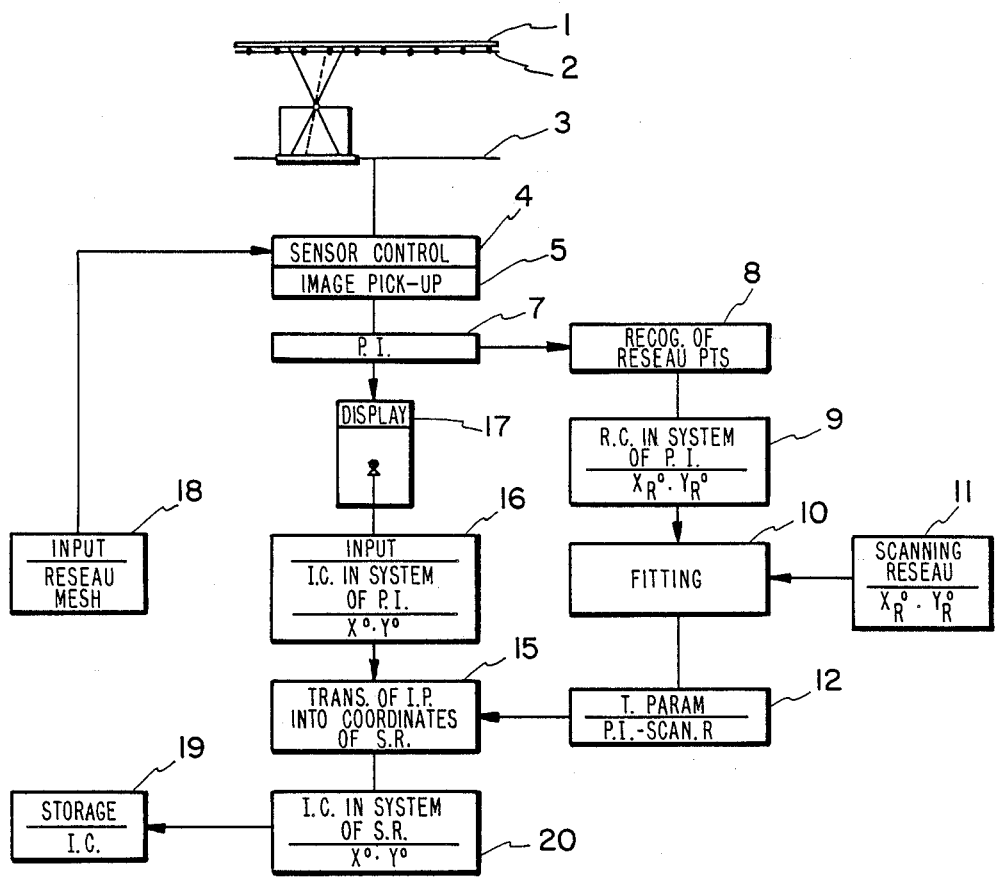

FIG. 13 shows the data flow for recording a partial-image as a function of processing time. After the image is recorded at time $t_0$ (reseau, image register 1) and $t_1$ (object, image register 2), the first image can be evaluated at time $t_2$. Since only reseau points are imaged, a reliable and, due to the uniformly high contrast in the vicinity of the point, a very accurate point determination is possible. At time $t_3$, the second image can then be evaluated and the image coordinates measured can be specified directly in the coordinate system of the reseau by the transformation parameters found. The cycle time for recording one image is $$\Delta t = t_1 - t_0 = t_2 - t_1.$$

The time $t_3$ is of no consequence for the geometric stability of the system since the digitally stored images are available unchanged over any period of time.

If the opto-electric solid-state surface sensor cannot be moved close enough to the chamber reseau, there are problems in imaging object and image and reseau sharply at the same time. This is because, when the plane of the reseau is not coincident with the imaging plane, the planar exit pupil (AP) of the recording objective images the reseau unsharply on the sensor area. For this reason, it is advantageous according to the invention if in such cases the imaging plane of the recording, in which the surface sensor is carried, is arranged outside the plane of the reseau and that the reseau is imaged with a second central projection onto the sensor area. Due to a second, almost point-shaped projection center, the chamber mesh reseau is projected with sharp contours into the plane of recording, which has the further advantage that the reseau marks can be read simultaneously or alternately. If the distance between the reseau and the imaging plane and also the area of the exit pupil is sufficiently large, the contours of the reseau projected through the recording objective appear to be very unsharp and thus almost transparent. This also makes it possible to pick up object points which are normally hidden by the reseau. The theory of this present example is explained in FIG. 14.

What is claimed is:

1. A method for the photogrammetrical pick up of an object, comprising the steps of:
   (a) providing a transparent master having present thereon an image in analog form;
   (b) covering the entire image with a reseau having a predetermined point array marked thereon on which divides the reseau into a pattern of discrete, contiguous meshes, defined by a coordinate system;
   (c) serially imaging, at least one mesh at a time, the reseau and the image area underlying each mesh to provide a series of partial analog images including the reseau points and analog image portions from each mesh;
   (d) opto-electrically converting from analog to digital the analog images of said partial-images to provide corresponding digital partial-images which include the reseau points;
   (e) correlating the reseau points in each of said digital partial-images with the predetermined positions of said points in said point array to provide transformation parameters; and
   (f) converting the digital partial-images into a total image by applying said transformation parameters.

2. A method as claimed in claim 1, further comprising the step of jointly storing the transformation parameters with the digital partial-image.

3. A method as claimed in claim 1, wherein said converting step comprises joining the partial-images together by rectification to form a digital total image.

4. A method as claimed in claim 1, further comprising after said step of imaging a reseau mesh to provide an analog partial-image, the steps of displaying the partial-image on a display screen and measuring in this display image coordinates, and transforming the display image coordinates and said transformation parameters into the coordinate system of the reseau.

5. A method as claimed in claim 1, further comprising the step of providing approximated image coordinates in the system of the partial-image, entering the approximated image coordinates into an auxiliary system, transforming the approximated image coordinates into the coordinate system of the reseaus, and controlling the serial imaging step according to the resulting coordinate system.

6. A method as claimed in claim 5, performed simultaneously for a plurality of masters.

7. A method as claimed in claim 1, further comprising the steps of:
   (g) providing an additional transparent master having preset thereon an additional image in analog form;
   (h) covering the entire image of said additional master with an additional reseau having a predetermined point array marked thereon which divides the additional reseau into a pattern of discrete, contiguous meshes, defined by a coordinate system;
   (i) serially imaging at least one mesh at a time said additional reseau and the image area underlying each mesh of said additional reseau to provide an additional series of partial analog images including the points of said additional reseau, and analog image portions from each mesh of said additional reseau;
   (j) opto-electrically converting from analog to digital the analog images of said additional series of partial-images to provide corresponding additional partial-images which include said points of said additional reseau;
   (k) stereoscopically displaying on a stereo display said series of partial-images and said additional series of partial-images utilizing image coordinates calculated from given object coordinates;
   (l) incorporating measuring marks of said stereo display into the point arrays of said reseau and additional reseau corresponding to said object coordinates.

8. A method as claimed in claim 7, wherein:
said covering steps (b) include positioning a surface sensor in the image plane of the reseau and said covering step (h) includes positioning an additional surface sensor in the image plane of the additional reseau;
said serially imaging step (c) includes projecting said image and reseau onto the surface sensor and step-wise displacing said surface sensor from mesh to mesh; and
said serially imaging step (i) projecting said additional image and additional reseau onto the surface of said additional sensor and step-wise displacing said surface sensor from mesh to mesh of said additional reseau.

9. A method as claimed in claim 8 further including the step of imaging the reseau utilizing a projection onto said surface sensor different from a projection of said master image.

10. A method as claimed in claim 1, wherein:
said covering step (b) includes positioning a surface sensor in the image plane of the reseau;
said serially imaging step (c) includes projecting said image and reseau onto the surface sensor; and
step-wise displacing said surface sensor from mesh to mesh; and
said correlating step (e) comprises the steps of
displaying said partial-images on a display screen; and
measuring coordinates of said partial-images on said display screen; and
transforming said measured coordinates into coordinates of said point array.

11. A method as claimed in claim 10, further including the step of imaging the reseau utilizing a projection onto said surface sensor different from a projection of said master image.

12. A method as claimed in claim 10, further including the step of projecting said image and reseau onto the surface sensor for a second time at a different magnification than in the first mentioned projecting step and repeating the remaining steps to provide an image scale for said partial-images.

13. A method as claimed in claim 12 further including the step of imaging the reseau utilizing a projection onto said surface sensor different from a projection of said master image.

14. A method as claimed in claim 1, comprising the step of optically separating said master and reseau by double exposure, said optically separating step including imaging the reseau point array onto a plane sensor without the image of said master, opto-electrically converting said reseau point array image and then imaging the master image positioned in the same geometric relation with respect to the reseau and opto-electrically converting said master image.

15. A method as claimed in claim 14, further including the step of displaying said reseau point array image and said correlating step includes determining said sensor positioning and master image utilizing said reseau point array image display.

16. A method as claimed in claim 15 comprising the step of utilizing reflecting reseau points.

17. A method as claimed in claim 15 comprising the step of utilizing semi-transparent reseau points.

18. A method as claimed in claim 15, including specifying measured master image coordinates in the coordinate system of the reseau in the evaluation of the master image.

19. A method as claimed in claim 18 comprising the step of utilizing reflecting reseau points.

20. A method as claimed in claim 18 comprising the step of utilizing semi-transparent reseau points.

21. A method as claimed in claim 14, comprising the step of utilizing reflecting reseau points.

22. A method as claimed in claim 21 comprising the step of utilizing semi-transparent reseau points.

23. A method as claimed in claim 11, comprising the step of utilizing semi-transparent reseau points.

* * * * *